United States Patent
Schuster et al.

(10) Patent No.: US 9,132,332 B2
(45) Date of Patent: Sep. 15, 2015

(54) WHEELED BAG AND SUPPORT CHASSIS

(71) Applicants: Jeff Schuster, Louisville, KY (US); Caprice Neely, Portland, OR (US)

(72) Inventors: Jeff Schuster, Louisville, KY (US); Caprice Neely, Portland, OR (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 14/026,378

(22) Filed: Sep. 13, 2013

(65) Prior Publication Data

US 2015/0076778 A1    Mar. 19, 2015

(51) Int. Cl.
*B62B 1/00*    (2006.01)
*A63B 71/00*    (2006.01)
*B62B 1/26*    (2006.01)

(52) U.S. Cl.
CPC ............ *A63B 71/0045* (2013.01); *B62B 1/262* (2013.01)

(58) Field of Classification Search
USPC ............ 280/37, 33.993, 30, 35, 47.26, 47.33, 280/47.19, 42, 7.24, 644, DIG. 6, 652–654, 280/651
See application file for complete search history.

(56) References Cited

U.S. PATENT DOCUMENTS

| | | | |
|---|---|---|---|
| 5,244,219 A * | 9/1993 | Hadlum | 280/47.26 |
| 5,253,739 A | 10/1993 | King | |
| D364,020 S * | 11/1995 | Wang | D34/23 |
| 5,743,363 A * | 4/1998 | Rekuc et al. | 190/18 A |
| 6,009,995 A | 1/2000 | Speck | |
| 6,098,769 A * | 8/2000 | Yen | 190/108 |
| 6,220,412 B1 | 4/2001 | Lin | |
| 6,227,339 B1 | 5/2001 | Bogert | |
| 6,595,358 B1 | 7/2003 | Speck | |
| 6,732,863 B2 | 5/2004 | Speck | |
| 7,219,902 B1 | 5/2007 | Herold | |
| 2009/0283990 A1 * | 11/2009 | Graham | 280/651 |

OTHER PUBLICATIONS

Osprey Packs, Inc., Contrail Luggage with High Road Chassis, www.ospreypacks.com/en/group/wheeled_bags/contrail_series.
Osprey Packs, Inc., Ozone Luggage with High Road Chassis, www.ospreypacks.com/en/group/ultra-light_bags/ozone_series.

* cited by examiner

*Primary Examiner* — John Walters
*Assistant Examiner* — James Triggs
(74) *Attorney, Agent, or Firm* — Valenti, Hanley & Robinson, PLLC; Kevin T. Duncan

(57) ABSTRACT

This invention relates generally to an arched one-piece wheeled support chassis fixedly attached to a bag or container. The main body of the wheeled support chassis is arched or curved inwards from back to front and upwards from bottom to top. The curvilinear architecture of the wheeled support chassis provides for substantial strength and rigidity to support a bag or container and its contents while allowing the wheeled support chassis to be both thin and lightweight.

25 Claims, 7 Drawing Sheets

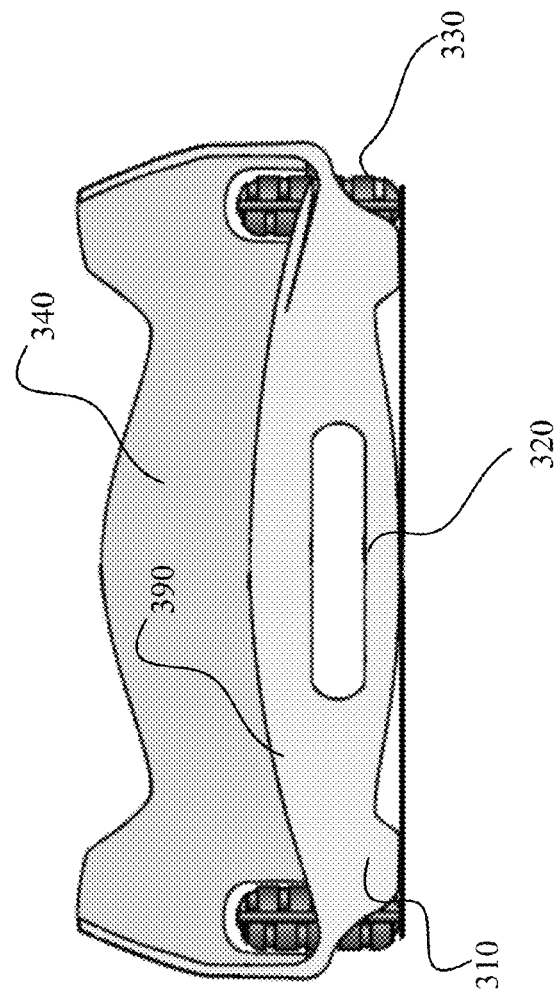
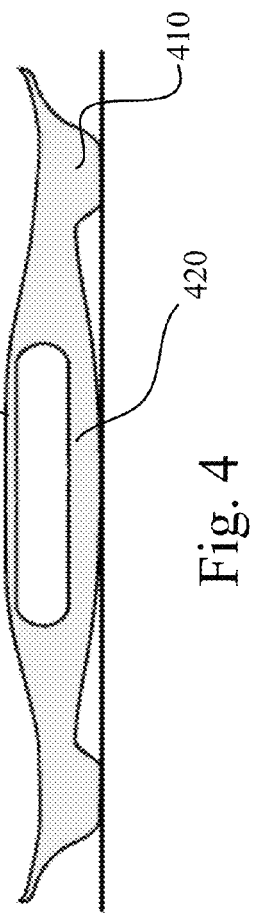
Fig. 3
Fig. 4

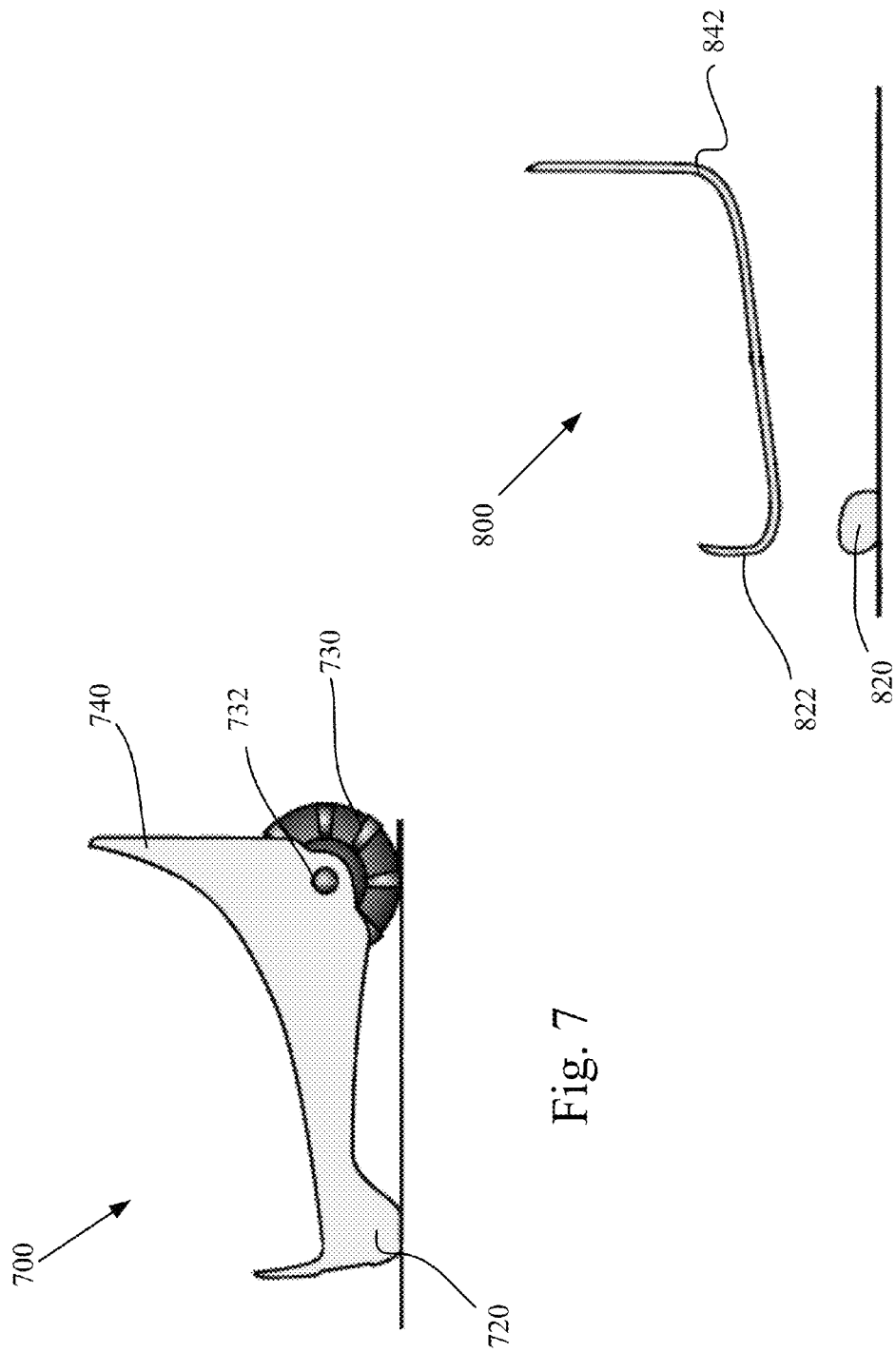

WHEELED BAG AND SUPPORT CHASSIS

FIELD OF INVENTION

This invention relates generally to an arched one-piece wheeled support chassis fixedly attached to a bag or container. The main body of the wheeled support chassis is arched or curved inwards from back to front and upwards from bottom to top. The curvilinear architecture of the wheeled support chassis provides for substantial strength and rigidity to support a bag or container and its contents while allowing the wheeled support chassis to be both thin and lightweight.

BACKGROUND OF THE INVENTION

Many devices exist that enable a bag or container to be wheeled or pulled along the ground or floor. Such devices enable the user to easily move or transport the bag without having to carry the bag, allowing the user to more easily move a loaded container. Furthermore, bags such as sports equipment bag exist that incorporate wheeled frames and rigid support structures.

Baseball equipment bags have become more sophisticated with time. The early prior art bags were typically an elongated duffel or roll-type bag having a zippered opening and an elongated storage compartment for storing the player's equipment. This type of bag is popular because of its soft-sided feature which makes it easy to store and transport. The player's equipment typically includes at a minimum a bat, a ball glove, one or more balls, a cap, and playing shoes. Many players will also carry additional equipment, as for example a batting glove, glasses, a scorebook or pine tar, to name but a few. Additionally, it may be desirable to carry the player's shirt, pants and a towel in the bag for convenience. Thus, a variety of items may typically be carried in the player's bag. The plain elongated duffel or roll-type bag with one elongated compartment is not suited to carry multiple pieces of equipment, many of which may be large, ungainly, or heavy. Existing roll-type bag may have wheel frames that consist of a rectangular shape with wheels mounted on the left and right sides of the frame, possibly just inside the left and right sides.

The problem with existing roll-type bags is that they are unable to support the weight of a player's equipment and the bottoms of the bags often bow or sag, causing the bottom of the bag to be dragged through dirt, water, or mud. The bowing also causes the bag to quickly wear out from the friction of being dragged along rough surfaces. An additional problem with existing roll-type bags is that sagging caused by heavy equipment puts undue strain on the wheels and axles from the bowing or cambering that results from a heavy equipment load, causing premature failure of the wheels and axles. Bowing or cambering of the wheels also causes them to fall out of alignment, drastically shortening the life span decreasing their efficiency and making pulling or wheeling the bag increasingly difficult.

Existing roll-type bags also have a problem with ground clearance. The bag often extends down between the wheels and axles, leaving only an inch or less between the bottom of the bag and the ground. This causes the bottom of the bag to drag, catch, or snag on even small obstacles which may cause damage to the bag or may cause the user to trip or stumble. There exists a need in the art for a bag that has a strong, lightweight wheel chassis that supports the bag and prevents bowing, provides for adequate ground clearance, and keeps the wheels and axles in line.

SUMMARY OF THE INVENTION

The present invention was developed to improve performance of wheeled bags. Specifically with outdoor sports wheeled bag lay close to the ground creating friction and heavy wear-and-tear. The arched shape of the present invention elevates the rear (wheeled) end of the bag providing clearance over most surfaces. Additionally, this clearance reduces ground friction and thereby enhances the durability of the bag.

In one embodiment, the present invention is a uni-body or one piece, 3D molded chassis that incorporates a curved and/or arched architecture that strengthens the chassis as well as provides greater ground clearance when in standing vertical position as well as when tilted or pulled. The problem with previous non-arched or non-curved wheeled chassis systems is that when the bag is loaded, the weight of the contents inside the bag can cause the area between the wheels to sag and even touch the ground in certain circumstances.

With the present invention, the curved and/or arched architecture eliminates sagging and strengthens the area between the wheels so the wheels don't camber even when the bag is fully loaded. The curved and/or arched architecture of the wheeled support chassis prevents sagging or drooping of the bottom of the bag. Preventing sagging or drooping keeps the bottom of the bag from touching the ground, and therefore the bottom bag will not wear out from wear caused by friction from being dragged along the ground. Also, preventing sagging or drooping improves ease of rolling the bag because the wheels always remain aligned properly and do not bow in or out. A uni-body or one piece molded chassis reduces areas of weakness in the overall structure. Furthermore, the uni-body construction also allows for a more secure & integrated attachment of the wheels than with other multi-piece chassis systems.

The present invention may be used with sports bags, duffel bags, coolers, or any other flexible bag that would otherwise suffer from bowing or distending when being pulled on wheels.

In a first embodiment, the present invention may comprise a bag and wheeled support frame comprising a flexible bag and a strong, lightweight, one-piece support frame. The flexible bag may comprise a top, bottom, left and right sides, front and rear forming an enclosure, said flexible bag having a length defined between said top and bottom. The one-piece support frame may comprise a front, back, left side, right side, and bottom, said back and bottom being of a substantially curvilinear design, wherein said back is curved inward horizontally towards said front, and said bottom is curved upwards vertically, the substantially curvilinear design preventing weight or stress from bowing or flexing said one-piece support frame. The one-piece support frame may also comprise a means for rolling and a means for fixedly attaching the frame to the bottom of the flexible bag.

In a second embodiment, the present invention may comprise a sports bag and wheeled support frame comprising a flexible, elongate bag and a strong, lightweight, one-piece support frame. The flexible, elongate bag may comprise a top, bottom, left and right sides, front and rear forming a first enclosure, said flexible, elongate bag having a length defined between said top and bottom. The flexible, elongate bag further may further comprise a second enclosure within said first enclosure having an opening on said top and having a length defined between said top and bottom, the second enclosure adapted to store sporting equipment. The one-piece support frame may comprise a front, back, left side, right side, and bottom, said back and bottom being of a substantially curvilinear design, wherein said back is curved inward horizontally towards said front, and said bottom is curved upwards vertically, the substantially curvilinear design preventing weight or stress from bowing or flexing said one-piece support frame. The one-piece support frame may also comprise a means for rolling and a means for fixedly attaching the frame to the bottom of the flexible, elongate bag.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 3 is a front perspective view of an embodiment of the wheeled support chassis without an attached bag.

FIG. 4 is a front cross-section view of an embodiment of the wheeled support chassis at the front handle portion of the wheeled support chassis.

FIG. 7 is a lateral perspective view of an embodiment of the wheeled support chassis without an attached bag.

FIG. 8 is a side cross-section view of an embodiment of the wheeled support chassis at the midsection of the wheeled support chassis as seen in FIG. 7.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
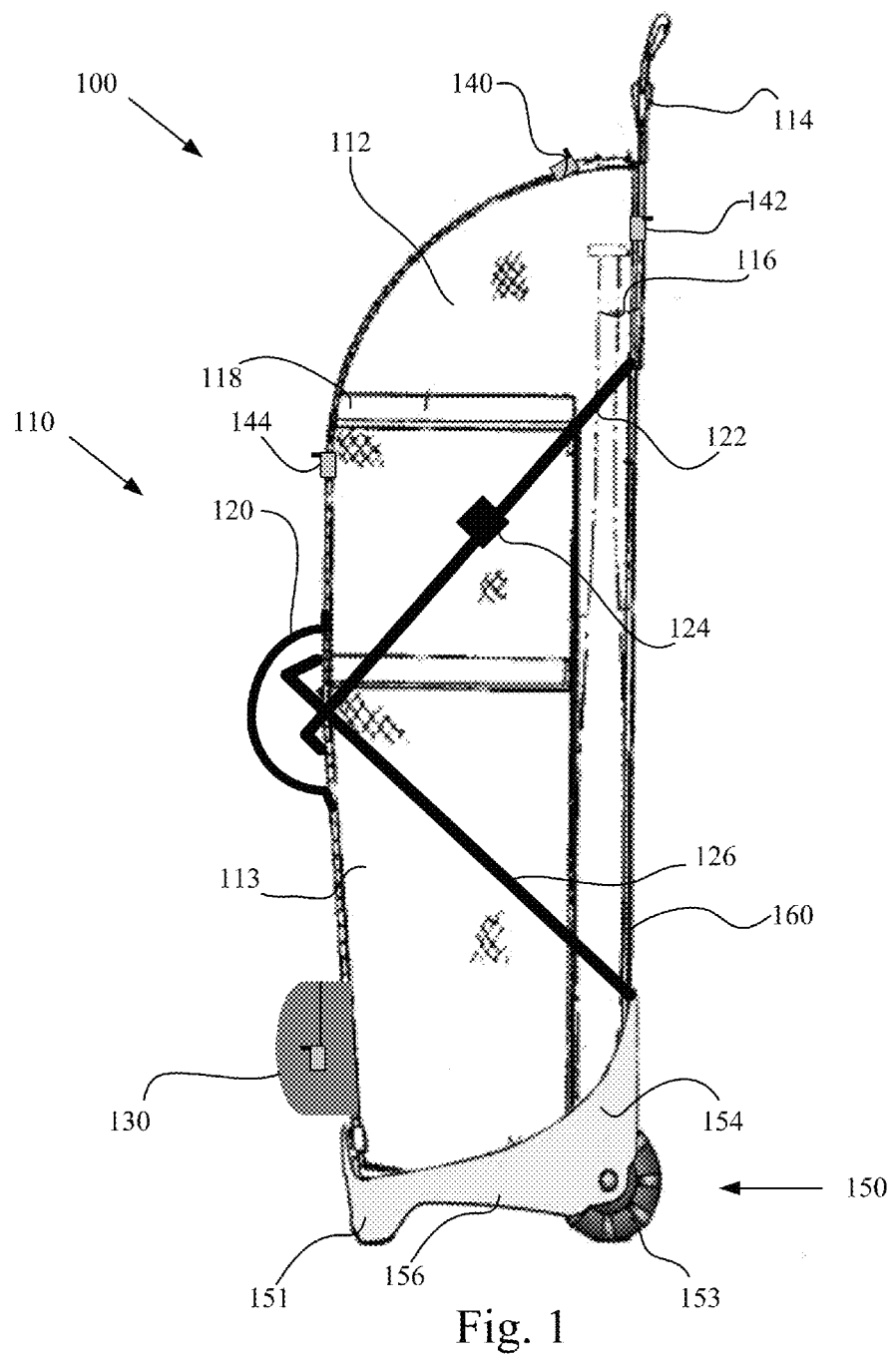
FIG. 1 is a lateral view of an embodiment of the bag with wheeled support chassis in a vertical configuration.

With reference to FIG. 1, an embodiment of the present invention is shown as bag and wheel support chassis 100. The bag and wheel support chassis 100 comprises the bag 110 and the arched wheeled support chassis 150. In this embodiment, bag 110 is a duffel type sports bag. More specifically, bag 110 is a baseball equipment bag. Bag 110 may be made of one or more materials including nylon, polyester, cotton, silk, rayon, or any combination or blend of these and other materials. Components or portions of bag 110 may be reinforced with materials such as plastic, metal, leather, glues or epoxies.

The body of bag 110 may comprise one or more compartments or pockets such as an upper interior compartment 112, lower interior compartment 113, and bat storage compartment 116. The upper and lower interior compartments 112 and 113 may be accessed by zippers 140 and 144 respectively, or may be accessed by other suitable access means. Bat storage compartment 116 may be accessed by zipper 142 which may further comprise a loop, ring, or other slot to provide for locking of the bat storage compartment 116. The bat storage compartment 116 may also be separated from the interior of bag 110 such that it is securely enclosed using a lockable zipper 142. Furthermore, bat storage compartment 116 may be subdivided into one or more bat storage slots. These storage slots may be padded and labeled to provide for protection and easy identification of the bats stored therein.

Upper and lower interior compartments 112 and 113 may be separated by rigid or semi-rigid separators such as separator 118. Separator 118 serves to both separate interior compartments of bag 110 and to act as a shelf when bag 110 is oriented in a vertical configuration. Separators such as separator 118 may also be configured to be moved or removed using hook-and-loop fasteners, zippers, buttons, buckles, or other fastening means. The interior compartments 112/113 may also have one or more vents or holes or may be partially comprised of a breathable fabric such as a mesh to provide for ventilation in the compartments. Interior compartments 112/113 may also have one or more fasteners or tie downs, e.g., straps and buckles, to secure objects inside the compartments. Lower interior compartment 113 may also have one or more pockets or sub-compartments to provide for storage, organization, and access to items contained therein.

At the top of bag 110 a handle 114 is provided. Handle 114 and/or additional means for hanging the bag in a vertical orientation (as shown) may also be adapted to allow for the bag 110 to be hung from, for example, a chain link fence. Such hanging means may comprise one or more hooks, fasteners, clasps or clamps that would allow the bag 110 to be releaseably attached to the surface. The hangers may also be separate from handle 110 and may also be configured to be separately storable or removable when not in use. In one embodiment, the hangers may be stored inside the bat compartment 116 when not in use.

On the front of bag 110 a protected compartment 130 is provided to store items that may be susceptible to damage if stored in the interior of bag 110. Items such as phones, cameras, sunglasses, or watches may be stored in this compartment so that they will not be crushed or damaged by heavier objects inside the bag. The protected compartment 130 may also comprise a removable customizable place or facing (such as for stitching or screen print) that may be fastened to the front of the compartment. For example, a team logo, slogan, or other personalization may stitched or imprinted on the plate and be fastened by hook-and-loop fasteners, buttons, zippers, or may slide into a transparent outer pocket portion.

A tote handle 120 is also provided on the front exterior of bag 110. The tote handle is fastened to the bag and allows the bag and wheeled support chassis 100 to be carried in a horizontal orientation when it is not possible or desirable to wheel the device on the ground. The tote handle 120 is also supported by adjustable strap 122 and strap 126. Adjustable strap 122 and strap 126 are connected by a releasable fastener 124 which may be, for example, a buckle. In one embodiment, the adjustable strap 122 and strap 126 perform two primary functions. First, they secure objects inside the bag 110 by compressing the bag 110 to prevent objects from moving about in the interior compartments 112 and 113. Second, the adjustable strap 122 and strap 126 provide support for the handle 120 by distributing the bag and wheeled support chassis' 100 weight along the straps and back of the bag 110. This decreases the strain on the handle 120 which prolongs the useful life of the handle.

Fixedly attached to the bag 110 is the wheeled support chassis 150. The wheeled support chassis 150 may be attached to bag 110 using one or a combination of rivets, nuts and bolts, screws, adhesives, or other means for fixedly and securely attaching the wheeled support chassis 150 to bag 110. The wheeled support chassis 150 is preferably a one piece or unibody support structure that both supports the bag 110 and provides for wheeled transport of the bag 110. The primary components of the wheeled support chassis are the handle and stand portion 151, the arched midsection 156, and back support section 154. Wheels 153 are attached by a set of axles that are integrated into the one piece chassis of wheeled support chassis 150. The bag 110 may be further supported by a flexible support section 160 that is integrated into the lower rear portion of the bag 110.

Figure 2:
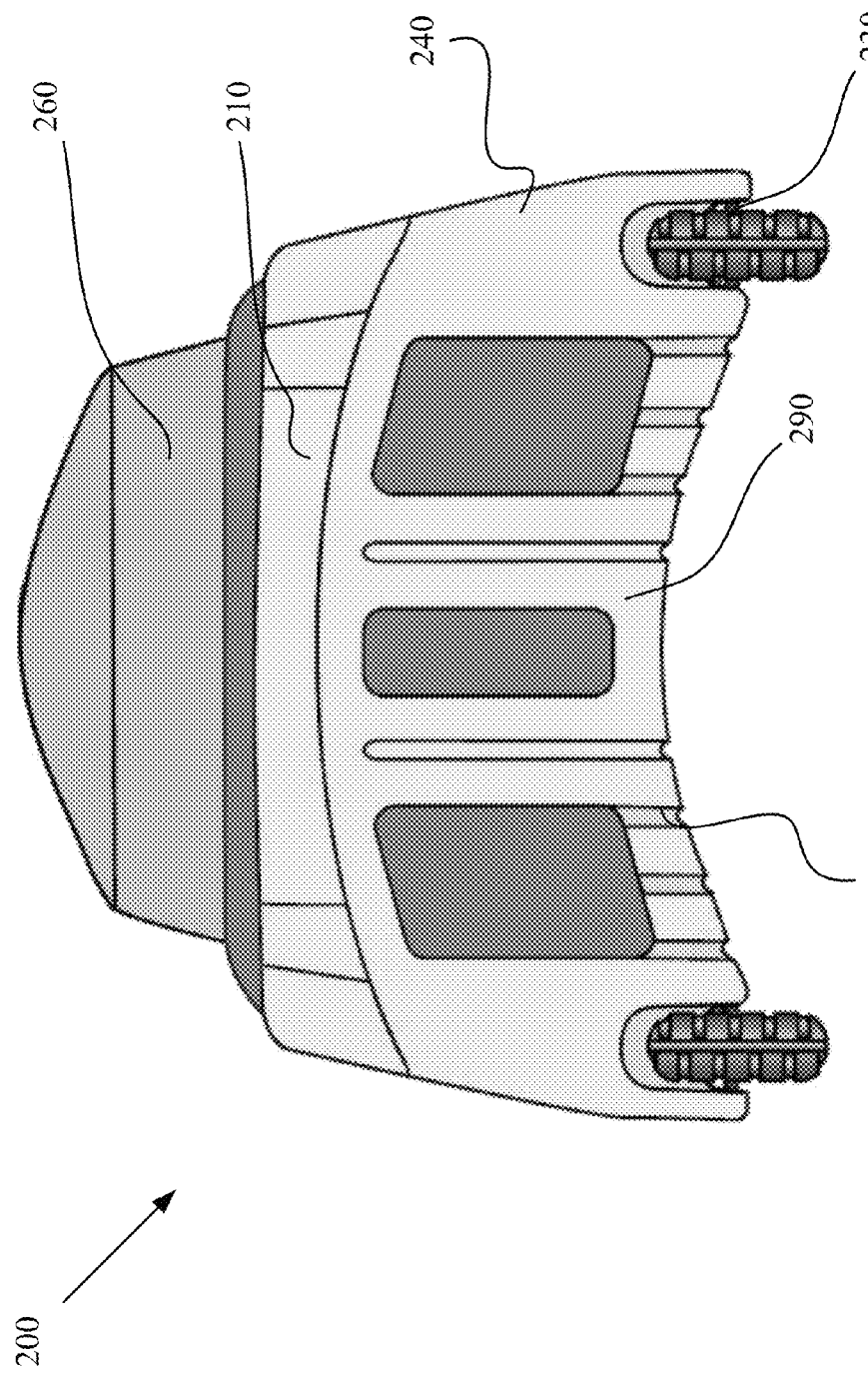
FIG. 2 is a bottom perspective view of an embodiment of the bag with wheeled support chassis lying flat on a planar surface.

With reference now to FIG. 2 a bottom perspective view of an embodiment of the bag and wheeled support chassis 200 is provided showing the bag in a lowered or horizontal orientation. The wheeled support chassis 240 is shown attached to bag 260. The bottom of a protected compartment attached to the bag 260 can be seen extending beyond the front surface of the wheeled chassis 240. In this perspective, the arched or curvilinear architecture of the rear of the wheeled support chassis 240 can be clearly seen. The arched portion 290 is curved both inwards, from the back of wheeled support chassis 240 to the front, and upwards, from the bottom to the top of the wheeled support chassis. The dual curved construction of the wheeled support chassis 240 as seen in the arched portion 240 provides additional rigidity and support to the wheeled support chassis 240. The additional rigidity and support keeps a bag, such as bag 260, from causing the wheeled support chassis 240 from bowing or flexing under a heavy load. The strength provided by the dual curved architecture keeps both the bag 260 and wheeled support structure 240 from dragging on the ground when being transported. The dual curved architecture of the wheeled support chassis 240 also provides additional ground clearance when the bag and wheeled support chassis 200 is being transported on the ground by wheels 230. Furthermore, the dual curved architecture prevents the wheels 230 from cambering or bowing under a heavy load.

In this embodiment, the wheeled support chassis 240 is comprised of a one piece or unibody main portion. A one piece configuration provides additional strength and stability and decreases both weight and possible points of failure in the wheeled support chassis 240. One or more indentations, channels, or ridges 250 may also be incorporated into the wheeled support chassis 240 to further increase the rigidity and stability of the wheeled support chassis 240. An additional benefit of a one piece configuration is additional strength provided to the axles of wheels 230. The wheels 230 may be attached more rigidly and securely than in other multi-part configurations. The wheeled support chassis 240 may be made from any rigid, lightweight material that may be formed into a one piece or unibody chassis, e.g., molded plastic, fiberglass, carbon fiber, aluminum, or other suitable strong and lightweight material.

Still with reference to FIG. 2, the wheeled support chassis 240 also comprises an integrated handle 210, which also serves as a stand or balance when the support chassis is vertically oriented. The integrated handle 210 may also comprise one or more outer stands located on the front left and right of the wheeled support chassis 240 to provide additional stability when it is vertically oriented.

With reference now to FIG. 3, a front perspective view of wheeled support chassis 300 is provided. The wheeled support chassis 300 comprises a front portion 390, a raised rear support portion 340, and wheels 330. The raised rear support portion 340 provides support and stability to the lower portion of any bag or container attached to the wheeled support chassis 300. The curved midsection and raised corners of raised rear support portion 340 provide additional stability, rigidity, and support. The front portion 390 also comprises an integrated handle 320 and outer stands 310. The front portion 390 may be substantially thicker than the rest of the wheeled support chassis 300, especially at the integrated handle 320 and outer stands 310, to provide increased strength to the wheeled support chassis 300 when being carried or oriented in a vertical configuration. The curved or arched architecture of the front portion 390 can also be seen. The curved architecture on both the front portion 390 and raised rear support portion 340 further increase the stability and rigidity of the wheeled support chassis 300.

With reference now to FIG. 4 and FIG. 3, a front cross-section view 400 of the front portion 390 as seen in FIG. 3 is provided. The front cross-section 400 is a cross-section of the rear-most portion of front portion 390. Shown are the integrated handle 420 and outer stands 410. The raised curved portion of front portion 390 is not shown as it only comprises the front edge of the front portion 390 and does not extend rearward beyond the front edge. The thinner top portion 430 can be seen. The thinner top portion 430 would extend from the lower region of the upper raised portion of front portion 390 rearward towards the main arched body of the wheeled support chassis 300. This can be seen in greater detail in FIG. 8 and FIG. 9.

Figure 5:
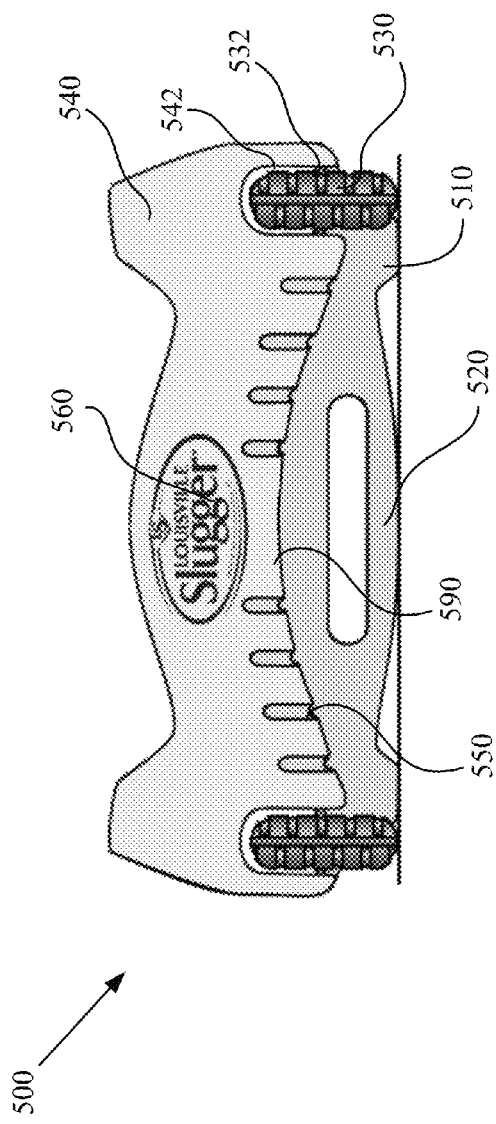
FIG. 5 is a rear perspective view of an embodiment of the wheeled support chassis without an attached bag.

With reference now to FIG. 5, a rear perspective view of the wheeled support chassis 500 is provided. A raised rear support portion 540 can be seen. The raised rear support portion 540 connects to the dual curved main arched body 590. Dual curved main arched body 590 is curved both upwards, towards the top of the wheeled support chassis 500, and inwards, towards the front of the wheeled support chassis 590. The raised rear support portion 540 also comprises wheel wells 542, logo 560, and may also comprise raised left and right corners and a curvilinear mid-section to provide for addition stability and rigidity. Wheels 530 are mounted on axles 532 which are integrated into the one piece or unibody construction of wheeled support chassis 500. The dual curved main arched body 590 may also possess one or more support indentations, channels, or ridges 550. The one or more support ridges 550 extend vertically down the raised rear portion 540 and then horizontally, forward, along the dual curved main arched body. Also seen are the rear of the integrated handle 520 and outer stands 510.

Figure 6:
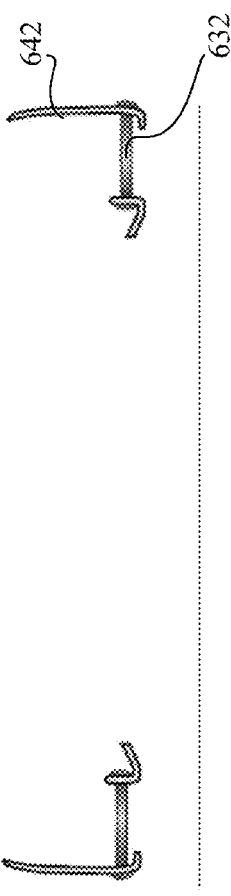
FIG. 6 is a rear cross-section view of an embodiment of the wheeled support chassis at the wheel axles.

With reference now to FIG. 6 and FIG. 5, a cross-section view 600 of wheeled support chassis 500 at axles 532 is provided. Not shown are wheels 530, which would be mounted on axles 632 in the cross-section view 600. Shown are the outer walls 642 of the wheel well 542. From this cross-section view 600 the thin construction of the wheeled support chassis 500 can be clearly seen. The thin, one piece/unibody design of the wheeled support chassis 500 keeps it lightweight while the dual curved architecture and support ridges 550 allow the wheeled support chassis 500 to be strong, stable, and rigid.

With reference now to FIG. 7, a side perspective view of wheeled support chassis 700 is provided. The wheeled support chassis 700 is shown in a vertical orientation without an attached bag or container. The thicker front portion 720 comprises both the outer stands and integrated handle. Wheel 730 is mounted on axle 732 which is fixedly and permanently secured in the wheel well of raised rear support portion 740. From this perspective, the corner support of raised rear support portion 740 can be more clearly seen than in FIG. 3 and FIG. 5.

With reference now to FIG. 8 and FIG. 7, a cross-section view 800 of wheeled support chassis 700 at the mid-point between the left and right sides of the wheeled support chassis 700 is provided. The cross-section view 800 shows the thin construction of the wheeled support chassis 700 that makes the wheeled support chassis 700 lightweight. The curvilinear design of the wheeled support chassis 700 can be seen at the front raised portion 822 and lower portion of raised rear support portion 842. The curvilinear design of the wheeled support chassis 700 enables the chassis to be lightweight, strong, rigid and stable. The thicker reinforced integrated handle 820 is also shown. The reinforcement on the integrated handle 820 is necessary due to the increased stresses on the integrated handle 820 when the wheeled support chassis is standing in a vertical configuration or when it is being carried.

Figure 9:
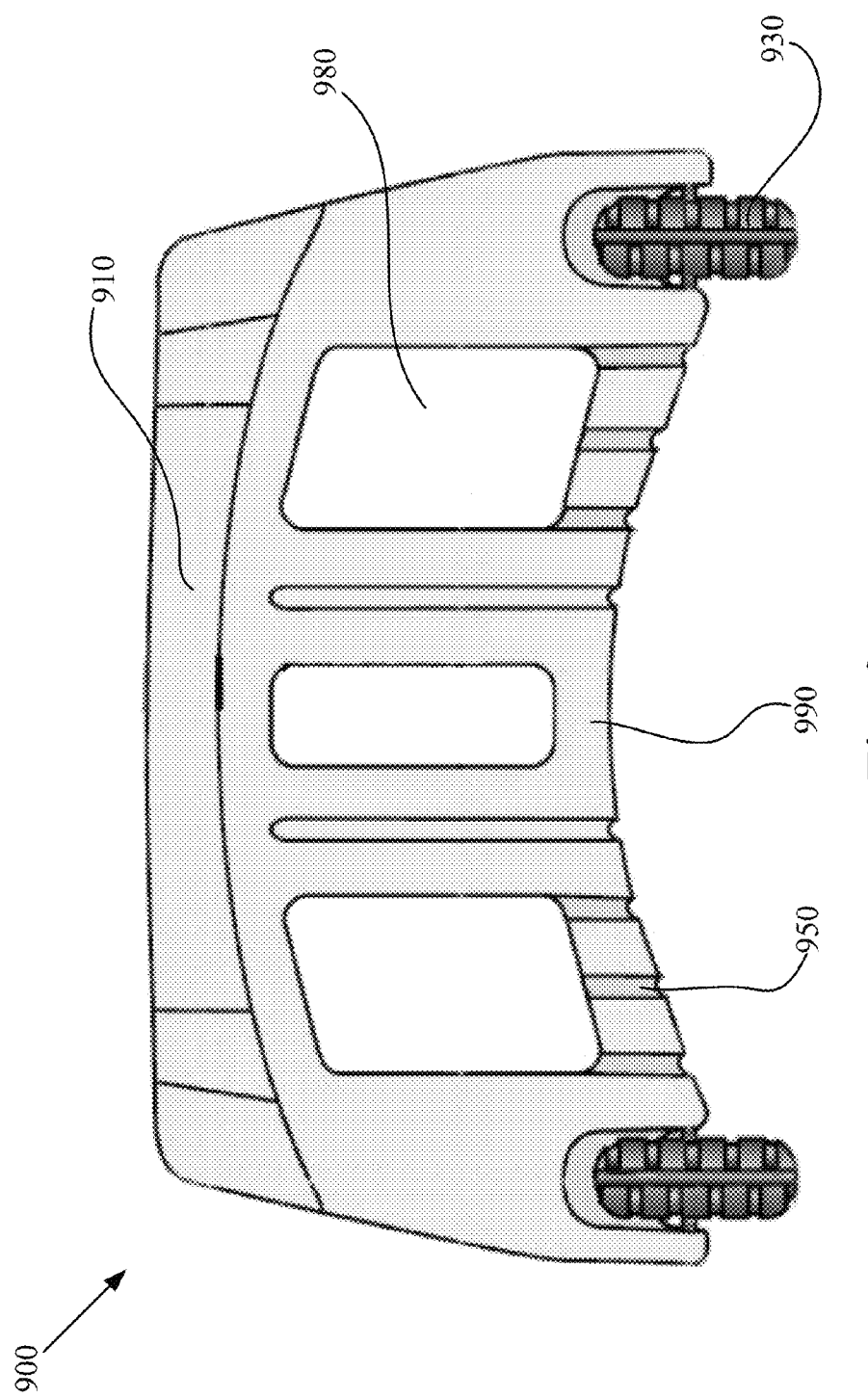
FIG. 9 is a bottom plan view of an embodiment of the wheeled support chassis without an attached bag.

With reference now to FIG. 9, a bottom plan view of the wheeled support chassis 900 in a horizontal orientation is provided. The wheeled support chassis 900 is seen from the bottom without an attached bag or container. The reinforced front portion 910 is shown at the top of the chassis and the wheels 930 are shown at the bottom. In addition to being constructed of a thin, lightweight material, the wheeled support chassis 900 may also have one or more gaps or holes 980 cut or molded into the chassis. These gaps or holes 980 further reduce the weight of the wheeled support chassis 900 while not significantly affecting its strength or rigidity. The primary strength of the wheeled support chassis 900 comes from its dual curved architecture and general curvilinear design. The curved back 990 is arched inward, from back to front, to increase the strength of the rear of the wheeled support chassis 900. The bottom of the wheeled support chassis 900 is also curved upwards, from bottom to top, to greatly increase the strength and rigidity of the bottom of the wheeled support chassis. The strength of the wheeled support chassis 900 is further improved by one or more ridges 950 which extend down the curved back 990 and then across the bottom of the wheeled support chassis. The ridges 950 on the bottom and back of the wheeled support chassis 900 help allow for gaps or holes 980 to be included without reducing the strength, stability, or rigidity of the chassis.

Figure 10:
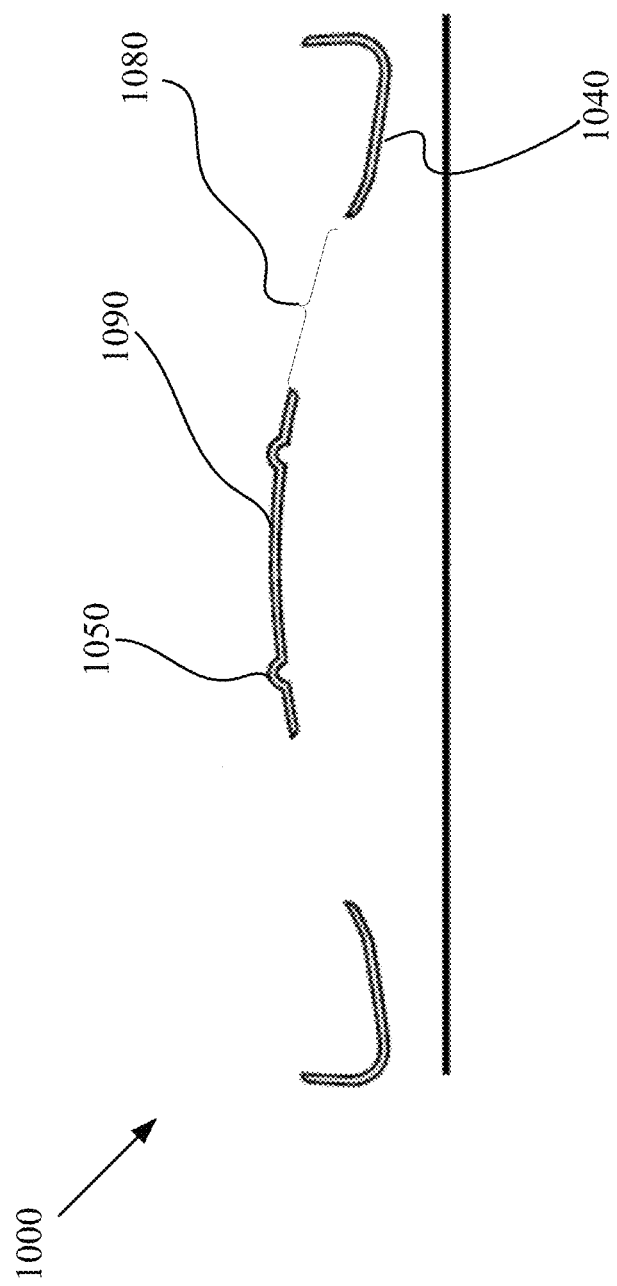
FIG. 10 is a front cross-section view of the wheeled support chassis at the mid-point between the front and rear of the wheeled support chassis.

With reference now to FIG. 10, a cross-section view 1000 of the present invention at the mid-point between the front and back of the chassis is provided. This cross section shows the upward curved or arched mid-section 1090 that was not clearly visible in FIG. 3 and FIG. 5. The curved or arched mid-section 1090 may have one or more ridges 1050 to further increase its strength. The curved or arched mid-section 1090 may also have one or more holes or gaps 1080 cut or molded into it to reduce the weight of the chassis without substantially affecting its strength. The curvilinear design of the curved corner 1040 that comprises the left and right edges of the chassis further increases the chassis' strength and rigidity. The thin construction of the chassis can also be clearly seen in the cross-section view 1000.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A wheeled bag and support frame comprising:
   a bag comprised of a flexible material having a top, bottom, left and right sides, front and rear forming an enclosure, said bag having a length defined between said top and bottom;
   a support frame comprising:
      a front, back, left side, right side, and bottom, said back and bottom being of a substantially curvilinear design, wherein, with said bag in a vertical orientation, said back is curved inwardly from side to side, and said bottom is curved upwardly from side to side, the substantially curvilinear design substantially preventing weight or stress from bowing or flexing said support frame;
   means for rolling said support frame; and
   means for fixedly attaching said support frame to said bag to result in an integrated bag and support product.

2. The wheeled bag and support frame of claim 1 wherein the bag further comprises one or more compartments within said enclosure.

3. The wheeled bag and support frame of claim 1 wherein said bag is made from a flexible fabric.

4. The wheeled bag and support frame of claim 1 wherein said bag further comprises a carrying handle attached to the front of said bag.

5. The wheeled bag and support frame of claim 1 wherein the back and the bottom of said support frame comprises one or more ridges to increase the strength and rigidity of said support frame.

6. The wheeled bag and support frame of claim 1 wherein the bottom of said support frame has one or more gaps or holes to reduce the weight of said support frame.

7. The wheeled bag and support frame of claim 1 wherein the means for rolling said support frame comprises a first wheel mounted on a first axle at the intersection of said right side, said back, and said bottom; and
   a second wheel mounted on a second axle at the intersection of said left side, said back, and said bottom.

8. The wheeled bag and support frame of claim 1 wherein the front of said support frame further comprises an integrated carry handle.

9. The wheeled bag and support frame of claim 1 wherein the bag further comprises a means for releaseably attaching the bag vertically on a vertical planar surface.

10. A wheeled sports bag comprising:
    a flexible, elongate bag having a top, bottom, left and right sides, front and rear forming an enclosed outer shell, said flexible, elongate bag having a length defined between said top and bottom, said flexible, elongate bag further comprising:

a first compartment within said outer shell having an opening on said front and having a length extending substantially from said top to bottom, the first compartment adapted to store sporting equipment;

a second compartment within said outer shell having an opening on said top and having a length extending substantially from said top to bottom, the second compartment adapted to store sporting equipment;

a support frame comprising:

a front, back, left side, right side, and bottom, said back and bottom being of a substantially curvilinear design, wherein, with said bag in a vertical orientation, said back is curved inwardly from side to side, and said bottom is curved upwardly from side to side, the substantially curvilinear design substantially preventing weight or stress from bowing or flexing support frame;

means for rolling said one-piece support frame; and means for fixedly attaching said one-piece support frame to the bottom said flexible, elongate bag.

11. The wheeled sports bag of claim 10 wherein the bag further comprises one or more additional compartments within said first compartment.

12. The wheeled sports bag of claim 10 wherein the bag further comprises one or more additional compartments on the exterior of said bag.

13. The wheeled sports bag of claim 10 wherein said bag is made from a flexible fabric.

14. The wheeled sports bag of claim 10 wherein said bag further comprises a carrying handle attached to the front of said bag.

15. The wheeled sports bag of claim 10 wherein the back and the bottom of said support frame comprise one or more ridges to increase the strength and rigidity of said support frame.

16. The wheeled sports bag of claim 10 wherein the bottom of said support frame has one or more gaps or holes to reduce the weight of said support frame.

17. The wheeled sports bag of claim 10 wherein the means for rolling said support frame comprises a first wheel mounted on a first axle at the intersection of said right side, said back, and said bottom; and a second wheel mounted on a second axle at the intersection of said left side, said back, and said bottom.

18. The wheeled sports bag of claim 10 wherein the front of said support frame further comprises an integrated carry handle.

19. The wheeled sports bag of claim 10 wherein the second compartment of the bag is adapted to vertically store one or more baseball bats separated by vertical dividers running from the top to the bottom of said second compartment.

20. The wheeled sports bag of claim 14 wherein the bag further comprises one or more adjustable straps extending across the front of said bag from the left rear to the right rear and running underneath said carrying handle.

21. The wheeled sports bag of claim 10 wherein the bag further comprises a semi-rigid enclosure defined by a top, bottom, front, back and left and right sides, the semi-rigid enclosure affixed to the front of said bag and having a resealable opening on the top of said semi-rigid enclosure.

22. The wheeled sports bag of claim 10 wherein the bag further comprises a first substantially planar, semi-rigid support panel affixed to the bottom of said flexible, elongate bag and a second substantially planar semi-rigid support panel affixed to the back of said flexible, elongate bag.

23. The wheeled sports bag of claim 10 wherein the first compartment of the bag has a first opening on the top and a second opening on the front, the second opening adapted to fully expose the interior of said first compartment.

24. The wheeled sports bag of claim 10 wherein the first compartment further comprises one or more vents or small openings adapted to provide ventilation to the interior of said first compartment.

25. The wheeled sports bag of claim 10 wherein the bag further comprises a means for releaseably attaching the bag vertically on a vertical planar surface.

* * * * *